United States Patent
Dahlberg

(10) Patent No.: US 6,895,812 B2
(45) Date of Patent: May 24, 2005

(54) CUP ANEMOMETER

(76) Inventor: Jan-Ake Dahlberg, Storsvängen 119, Hägersten (SE), SE-129 44

( * ) Notice: Subject to any disclaimer, the term of this patent is extended or adjusted under 35 U.S.C. 154(b) by 159 days.

(21) Appl. No.: 10/398,206
(22) PCT Filed: Oct. 5, 2001
(86) PCT No.: PCT/SE01/02172
§ 371 (c)(1), (2), (4) Date: Apr. 7, 2003
(87) PCT Pub. No.: WO02/29420
PCT Pub. Date: Apr. 11, 2002

(65) Prior Publication Data
US 2004/0083806 A1 May 6, 2004

(30) Foreign Application Priority Data
Oct. 6, 2000 (SE) .............................................. 0003623

(51) Int. Cl.$^7$ .............................................. A63B 53/00
(52) U.S. Cl. .............................. 73/170.01; 73/170.07; 73/170.12; 73/861.85
(58) Field of Search .................. 73/170.01, 170.07, 73/170.12, 861.85

(56) References Cited

U.S. PATENT DOCUMENTS

| | | | | |
|---|---|---|---|---|
| 3,465,584 A | * | 9/1969 | Camp et al. ............. | 73/861.85 |
| 3,541,855 A | * | 11/1970 | Frenzen et al. .......... | 73/861.85 |
| 4,078,426 A | * | 3/1978 | Casani et al. ............ | 73/170.07 |
| 4,102,188 A | * | 7/1978 | Simerl ..................... | 73/170.01 |
| 4,543,836 A | * | 10/1985 | Call ........................ | 73/861.85 |
| 4,703,659 A | * | 11/1987 | Lew et al. ............... | 73/861.24 |
| 4,735,094 A | * | 4/1988 | Marsh ..................... | 73/861.24 |
| 4,905,913 A | * | 3/1990 | Frikker ...................... | 239/751 |
| 5,357,795 A | * | 10/1994 | Djorup .................... | 73/170.12 |
| 5,656,865 A | * | 8/1997 | Evans .......................... | 290/55 |
| 5,710,380 A | * | 1/1998 | Talley et al. ............. | 73/861.85 |

FOREIGN PATENT DOCUMENTS

| | | |
|---|---|---|
| GB | 2 260 411 | 4/1993 |
| GB | 2 281 617 | 3/1995 |

* cited by examiner

Primary Examiner—Edward Lefkowitz
Assistant Examiner—Andre Allen
(74) Attorney, Agent, or Firm—Jacobson Holman PLLC

(57) ABSTRACT

The present invention relates to a cup anemometer having at least two cups (1) each attached to an arm (2) of a hub (3) on a rotary shaft. By cup is meant a generally seen cup-shaped body with a concave inner surface (6) and a convex outer surface (7) which meet at the opening of the cup. The opening of the cup is directed essentially along the tangent to the rotational path of the cups. The invention is based on the fact that the cups are truncated at their opening by means of three cuts (14, 15, 16) which are esentially located in three planes that are parallel with the tangent of the rotational path of the cups at the opening and that, projected on a fourth plane (9) having the tangent as normal, essentially form a triangle. The cups are attached to their arms (2) at one of the three corners (10).

14 Claims, 7 Drawing Sheets

Cross Section A-A

Figure 1:
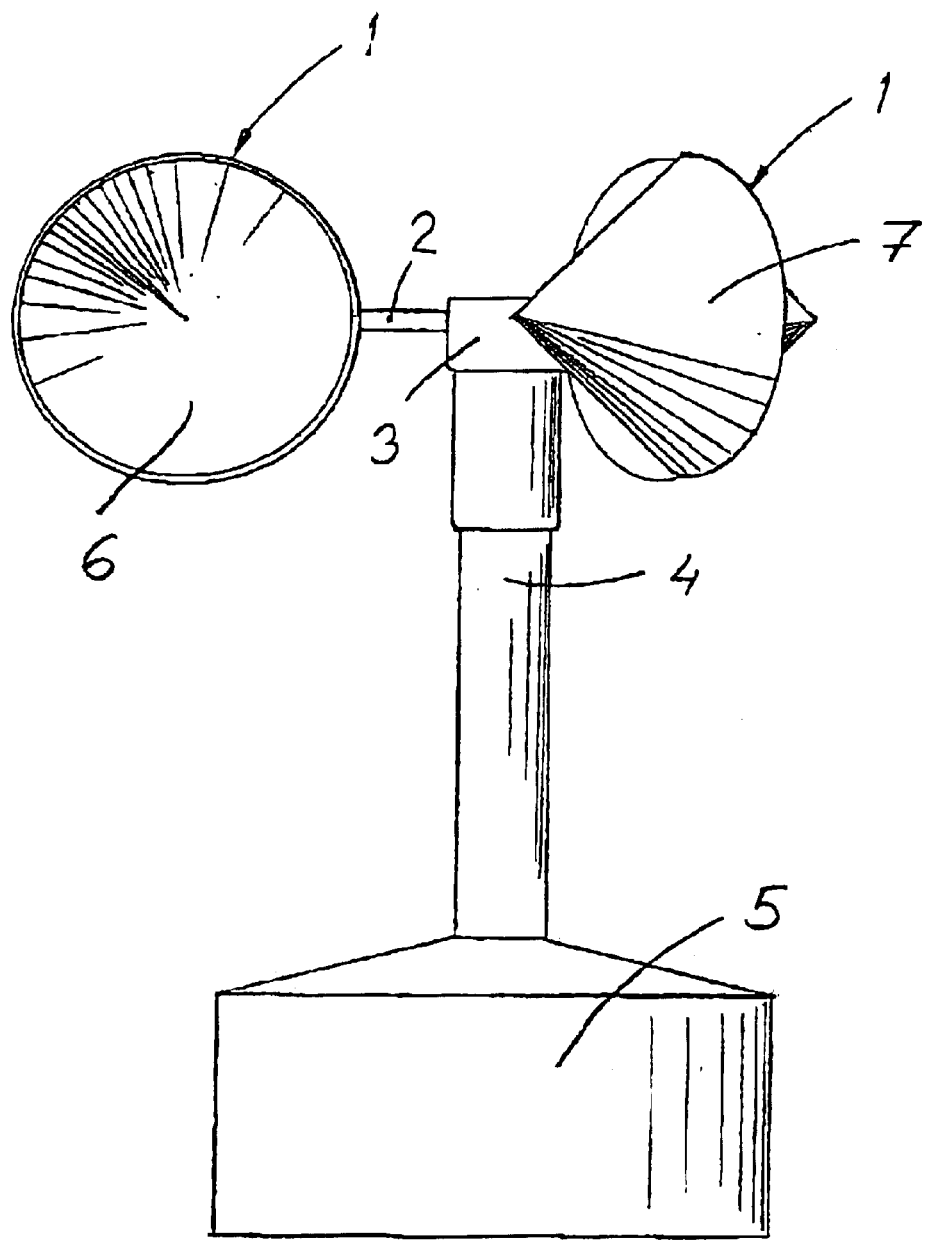

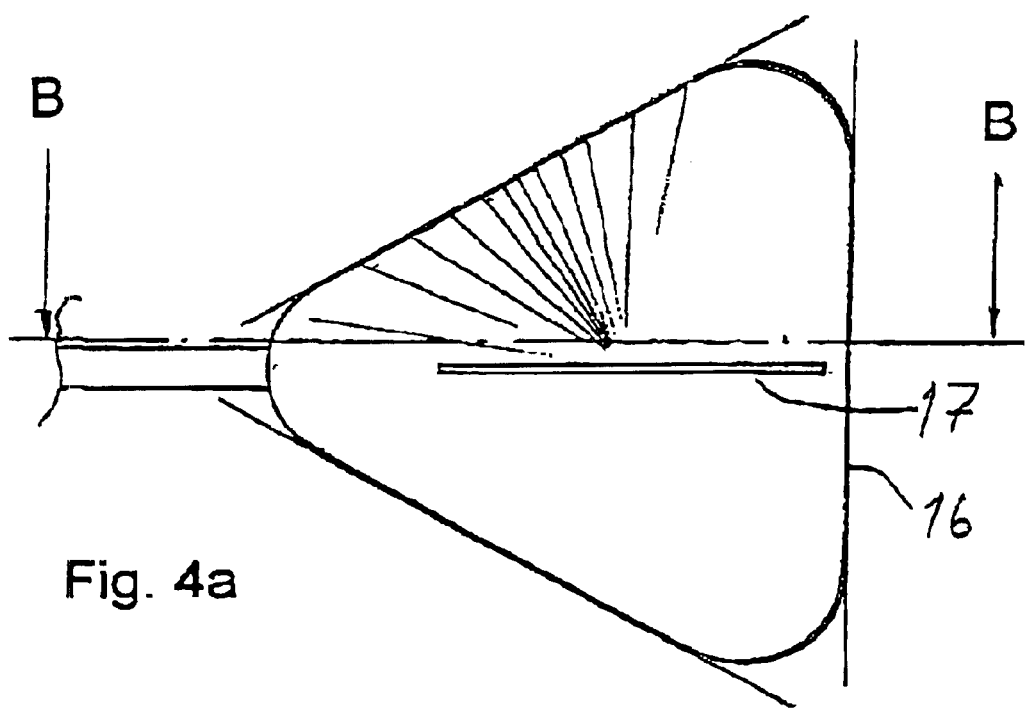
Fig. 4a
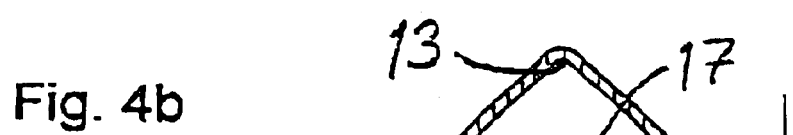
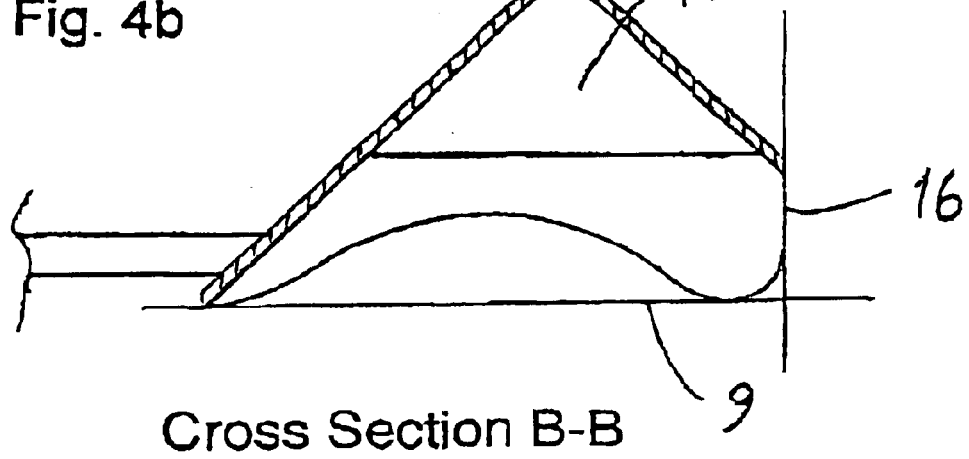
Cross Section B-B

CUP ANEMOMETER

This is a nationalization of PCT/SE01/02172 filed Oct. 5, 2001 and published in English.

The present invention relates to a cup anemometer. A cup anemometer is an instrument for measuring the speed of the wind and comprises a number of, in most cases three or four, cups which are attached to arms of a hub that is allowed to rotate freely about a normally vertical shaft The cups are usually semi-spherical or conical.

The rotary motion of the cup anemometer is caused by forces acting on the cups when the current of air blows against the cups. The forces give rise to moments round the vertical rotary shaft The forces acting on the cup or cups which essentially has/have their opening towards the wind are greater than those acting on the cup or Cups which essentially has/have its/their cupped or pointed side towards the wind. For a certain constant speed of the wind, the number of revolutions will set so as to cause balance between the moments from the driving and the braking parts. A well designed anemometer rotates at a speed which is essentially proportional to the speed of the wind.

The relationship between the speed of the wind and the rotational frequency of the anemometer is determined by calibration, in which the anemometer is subjected to known speeds of the wind, in most cases in a wind tunnel, over the entire working range. The problem with wind tunnel calibration is that it cannot be immediately transferred to actual conditions. This is due to the current of air In the tunnel being in mast cases very homogeneously directed and that the current of air has low turbulence. These conditions are not representative of actual field conditions where the wind blows against the anemometer from all directions at a varying strength (turbulence). The direction of the wind varies not only In the horizontal plane but also In the vertical plane. It has been found that wind speeds measured using anemometers of different makes under field conditions exhibit great differences although all anemometers were accurately calibrated in a wind tunnel.

The need for accurate measuring of the speed of the wind is particularly great in the field of wind energy since the obtainable power is proportional to the speed of the wind to the third power.

In the field of wind energy where cup anemometers are used to a very great extent, the speed of the wind has been defined as the resultant of the longitudinal, the transverse and the vertical component To be able to measure the wind according to this definition, the anemometer must have a flat angular response. It should also be possible for the anemometer to measure the size of the total vector independently of at what angle, horizontally as well as vertically, it blows against the anemometer.

All prior-art anemometers are more or less sensitive to winds having vertical angles of incidence, i.e. to winds not directed In the horizontal plane. This causes great problems when measuring the wind speed in the cases where the requirement for measurement accuracy is great. No cup anemometer is currently available that can measure the wind according to the definition as stated.

If the anemometer does not have a flat angular response, this also implies that a possible incorrect mounting of the anemometer, i.e. if it is not mounted fully vertically, results in the measurement of the wind being incorrect. Moreover the current of air over sloping ground follows substantially the surface of the ground, and an anemometer having a non-flat angular response will under such conditions measure an incorrect speed of the wind.

The problems described above are solved by the anemometer being given a completely new design, which essentially results in a flat angular response. This is achieved by the cups being given a certain design according to that sated in the independent claim. The other claims define advantageous embodiments of the invention.

Figure 2:
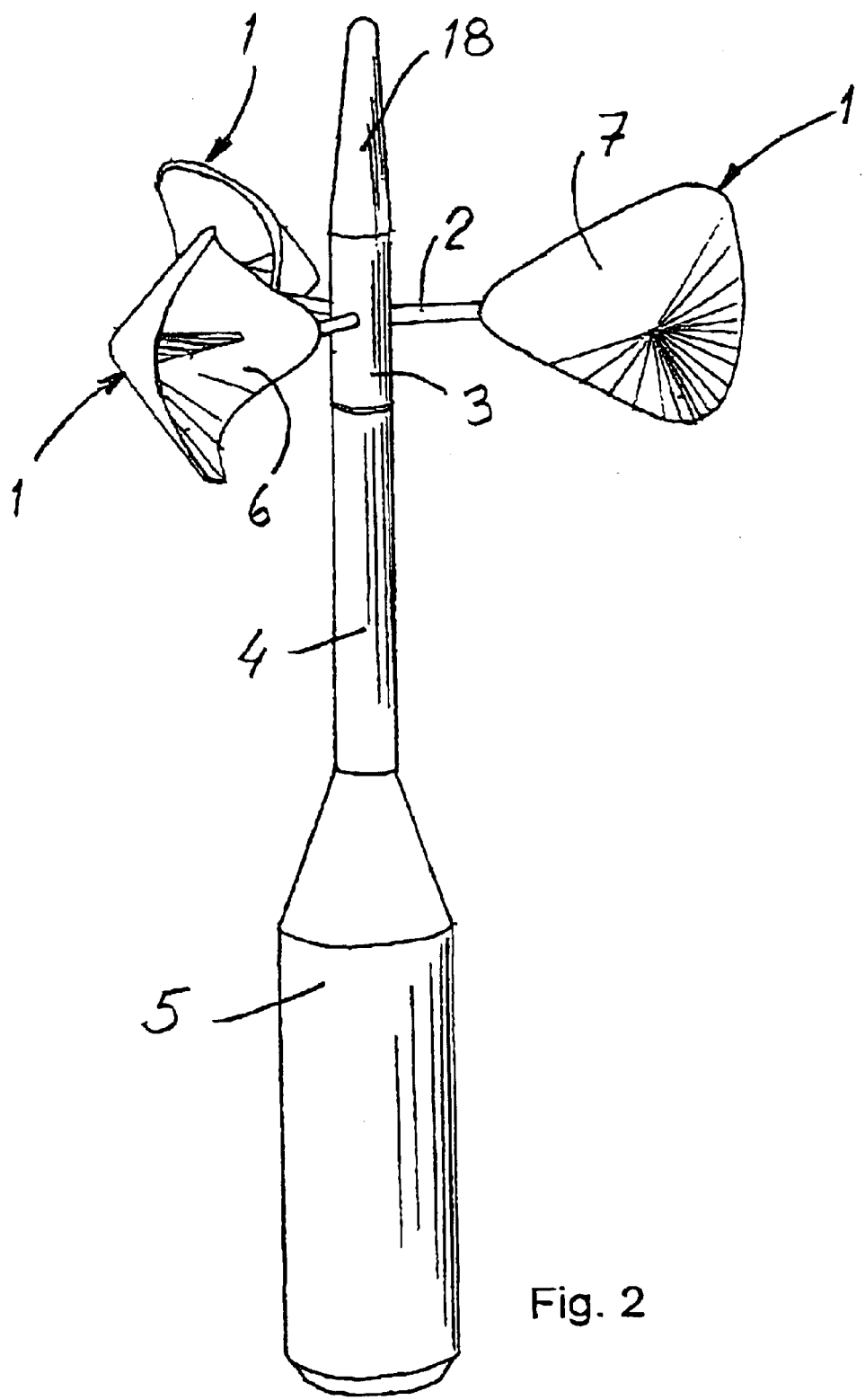
Figure 3A:
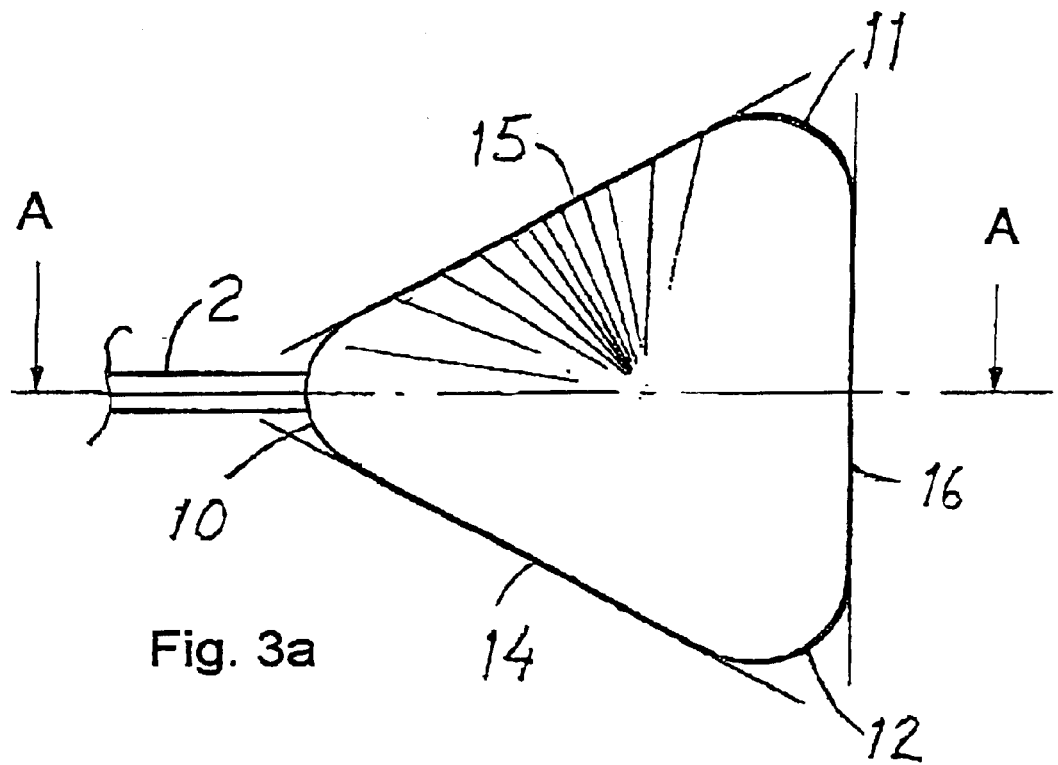
Figure 3B:
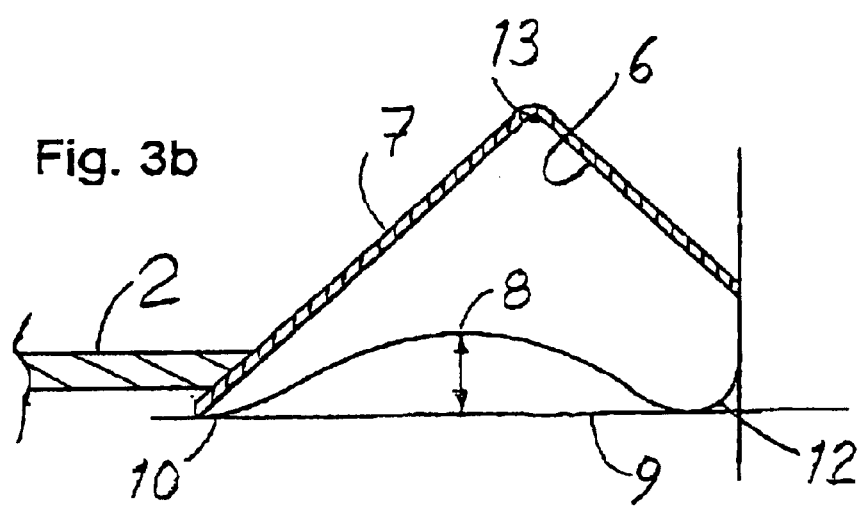
Figure 5:
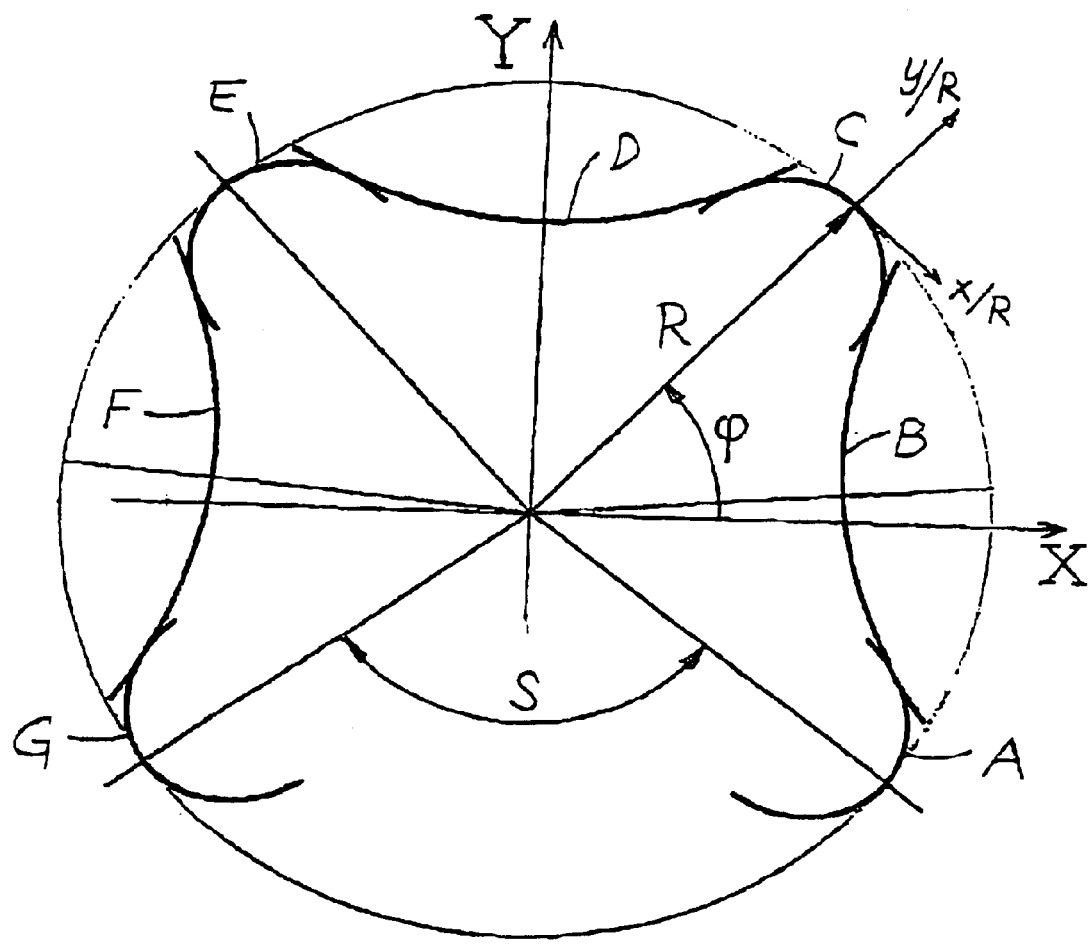
Figure 6:
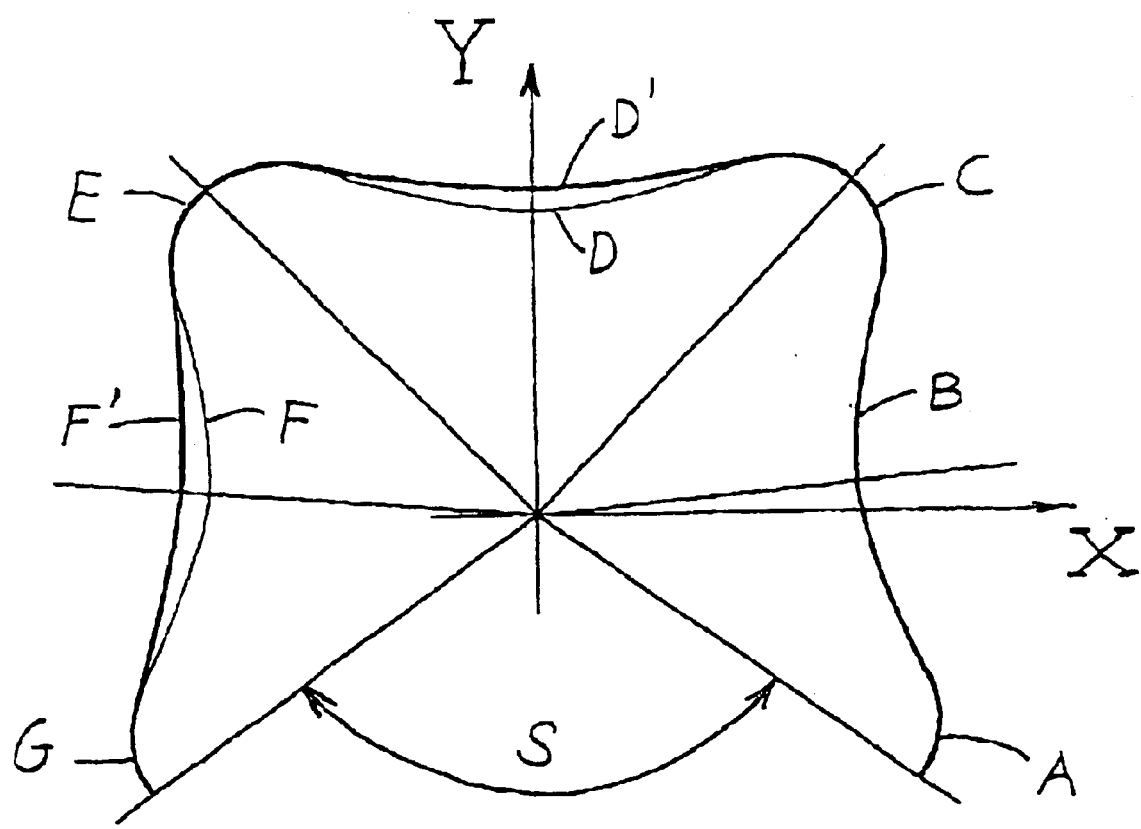
Figure 7:
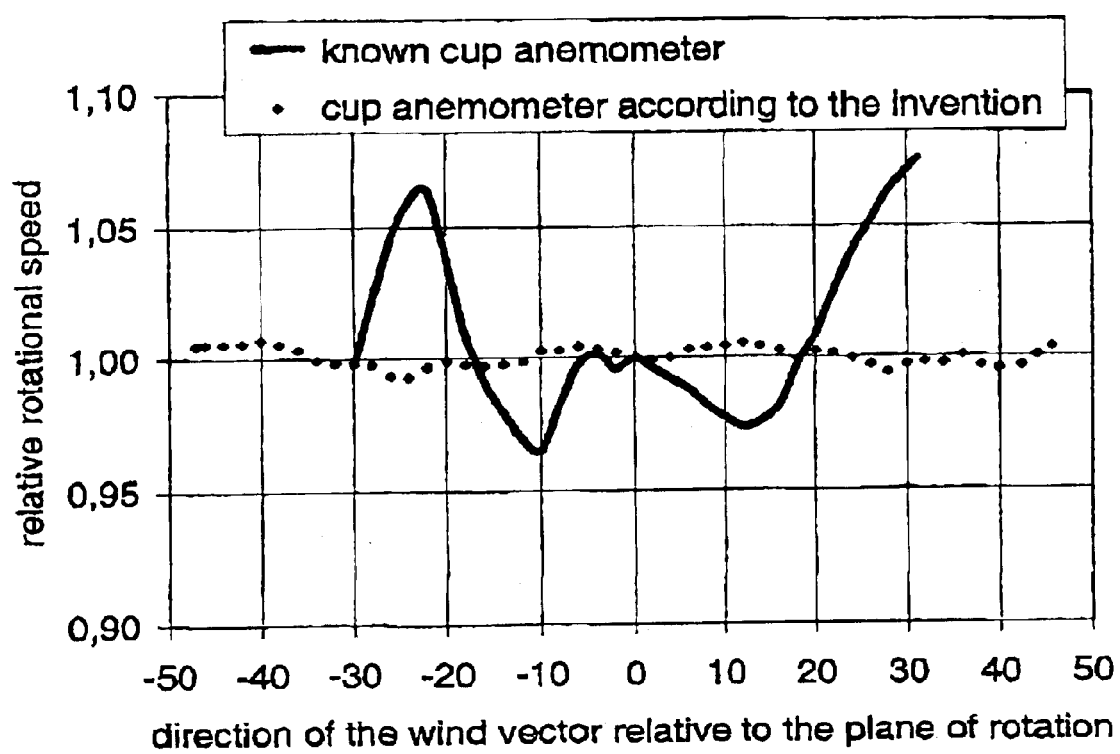

The Invention will now be described in more detail with reference to the accompanying drawings, in which FIG. 1 shows a prior-art cup anemometer, FIG. 2 shows an embodiment of a cup anemometer according to th invention, FIG. 3a shows the geometry of a cup in FIG. 2, FIG. 3b is a cross-sectional view of th cup in FIG. 3a, FIG. 4a shows an embodiment of a cup with a horizontal sheet therein, FIG. 4b is a cross-sectional view of th cup in FIG. 4a, FIG. 5 shows how the circumferential surface of a conical cup, according to a first embodiment of the invention, appears in one plane, FIG. 6 shows how the circumferential surface of a conical cup, according to a second embodiment of the invention, appears in one plane, and FIG. 7 shows a diagram of the angular response of a cup anemometer according to an embodiment of the invention, compared with the angular response of a prior-art cup anemometer.

The starting point of the present invention is a cup anemometer having at least two cups 1 attached to arms 2 which in turn are attached to a hub 3. The hub is attached to a rotary shaft that is mounted in a neck 4 of a housing 5.

By cup is here meant a generally seen cup-shaped body having a concave inner surface 6 and a convex outer surface 7. The surfaces meet at the opening of the cup. A special case, which is normally used in anemometers, involves cups that are rotationally symmetrical about a symmetry axis. When mounted in the anemometer, the symmetry axis of such a cup is essentially tangent to the rotational path of the cups. It may be generally said that the opening of the cups is directed essentially along the tangent to the rotational path of the cups. According to the invention, it is possible to use an arbitrary cup. See the description below of a preferred embodiment. An anemometer of this type usually has three or four cups. FIG. 1 shows a prior-art such anemometer with three cups 1.

The invention is based on the fact that the opening of the cup in combination with its arched part is given a cross-section that varies with the angle of incidence. When being exposed to the wind, the varying cross-sections will, like wing profiles of different cross-sections, deflect the current of air in different ways depending on the blowing angle. The deflection varying with the blowing angle causes, according to Newton's third law (the law on action and reaction), varying forces on the cups and, thus, varying moments round the rotary shaft. Correctly designed, the anemometer can obtain a substantially flat angular response.

A suitable variant to achieve this is to give the cups 1 a substantially triangular shape of their opening. The triangular shape can be obtained by the cups being truncated in three cuts that form a triangular pipe.

If the cup is rotationally symmetrical, as in the special case of a cone, the truncation causes an arcuate recess in the cup wall, see FIG. 3b. The highest point 8 of the arch measured perpendicular from the plane 9 that touches the three corners 10, 11, 12 of the cup should be about ⅓ of the maximum distance from said plane to the highest point 13 of the cup.

When the truncated cup profile is subjected to a wind blowing in a direction that is normal to one of the cuts, the wind sees an arcuate recess in the front part and a corner in the rear part. If instead the cup profile is subjected to a wind in a direction which is angled at about ±30° from the normal, and directed in a plane that is generated by the three corners, the wind sees an arcuate recess in the front part and an arcuate recess in the rear part. These cup profiles that vary depending on the angle of incidence and that are passed by the current of air cause varying forces and, thus, varying moments round the rotary shaft.

FIG. 2 illustrates an embodiment of a cup anemometer according to the invention with three cups 1. However, it is possible to use a different number of cups without deviating from the inventive concept.

As stated above, the invention is based on the fact that each cup is truncated at its opening by means of three cuts 14, 15, 16 which are essentially located in three planes that are parallel to the tangent of the rotational path of the cups at the opening and that, projected on a fourth plane 9 that touches the three corners of the cup, essentially form a triangle, see FIG. 3a. One of the three corners 10 is attached to the arm 2 extending from the hub 3.

Good results have been achieved by means of an embodiment of the invention where the triangle, seen in said plane, is essentially equilateral. The three corners 10, 11, 12 are conveniently cutoff or rounded. Rounded corners have been found to function very well and are shown in the Figures.

When manufacturing cups according to the invention, it is easy to make the desired cuts using a suitable tool, a small circular saw or the like. Below follows an example describing the manufacture of a template for the circumferential surface of a cup that satisfies the requirements according to the invention. With the aid of the template it is easier to make the cuts in a controlled fashion.

It has been mentioned above that both semispherical cups and conical cups are known in connection with cup anemometers. The angular response for spherical cups tends to be more speed-dependent than for conical cups at the wind speeds concerned. It is therefore suitable to use conical cups in the invention. An appropriate apex angle to the symmetry axis of the cone is about 45°.

FIG. 5 shows, split in a plane, the appearance of a manufacturing template for the circumferential surface of a conical cup which has an apex angle of 45° to the symmetry axis and an equilaterally triangular projection on a plane having the symmetry axis as normal. The corners am rounded. The edge of the circumferential surface is made up of 7 curves A–G. The curves are described in local coordinate systems (x,y) with the origin on the radius R and with the angle φ plotted from the positive X-axis in a global coordinate system (X, Y). The local coordinate systems have the y-axis directed radially outwards and the x-axis directed in the negative φ -direction.

The curves for the corners have in the local coordinate system (x,y) the formula $$\frac{y}{R} = a*\left(\sqrt{1 - b*\left(\frac{x}{R}\right)^2} - 1\right)$$

and the curves for the sides have in the local coordinate system (x,y) the formula $$\frac{y}{R} = a*\left(\frac{x}{R}\right)^{1.57} + b.$$

The constants a and b for each curve are evident from Table 1.

TABLE 1

| Curve | Angle φ° | a | b |
|---|---|---|---|
| A | −37.3 | 0.2581 | 19.0 |
| B | 5.1 | 0.3583 | −0.3226 |
| C | 47.6 | 0.2581 | 19.0 |
| D | 90.0 | 0.3583 | −0.3226 |
| E | 132.4 | 0.2581 | 19.0 |
| F | 174.9 | 0.3583 | −0.3226 |
| G | −142.7 | 0.2581 | 19.0 |

The location of the curves in the global coordinate system (X,Y) according to FIG. 5 is obtained by the following coordinate transformations $$X = R*\cos\phi + x*\sin\phi + y*\cos\phi$$

$$Y = R*\cos\phi + y*\sin\phi - x*\cos\phi$$

Successful tests have been carded out with cups having a radius R in the template which is 46.5 mm.

The sector S in the Figure is to be excluded when the template is to be rolled up to form a cone. S is calculated as the difference between angle φ of curve A and angle φ of curve G. i.e.

$$S = \phi_A - \phi_G = -37.3 - (-142.7) = 105.4°$$

The template gives the limit for the pans that are to be retained of a pure cone when parts of the edges of the cone at the opening are removed by machining. The described functions result in a cup that with good approximation in projection has essentially straight cuts and rounded corners.

A certain degree of further improvement of the flat angular response can often be achieved if the outer edge 16 of the cup is not given a purely linear projection on a plane having the symmetry axis as normal but instead somewhat more material of the original complete cone is saved. Correspondingly, a further improvement of the flat angular response, above all in the area +10° to +40°, can in many cases be achieved if somewhat more material of the original complete cone is saved at the upper edge 16.

In such an improved cup, as illustrated in FIG. 6, the manufacturing template of the circumferential surface is formed in the same way as described above, but having the constants a and b for each curve that are evident from Table 2. In FIG. 6, the new curves D' and F' are indicated by the thick lines while at the same time the previous curves according to the first variant are indicated by thinner lines for comparison.

TABLE 2

| Curve | Angle φ | a | b |
|---|---|---|---|
| A | −37.3 | 0.2581 | 19.0 |
| B | 5.1 | 0.3583 | −0.3226 |
| C | 47.6 | 0.2581 | 19.0 |
| D' | 90.0 | 0.1928 | −0.2731 |
| E | 132.4 | 0.2581 | 19.0 |
| F' | 174.9 | 0.1735 | −0.2667 |
| G | −142.7 | 0.2581 | 19.0 |

The size of the sector S according to the Figure, which is to be excluded, is the same as before.

For the angular response to be as flat as possible, the cups are to be arranged at a suitable distance from the centre of the hub. For conventional conical cups, the radius, defined as the shortest distance between the rotary shaft and the symmetry axis of the cups, should be about 120% of the diameter of the opening of the cup. In the case of rotationally symmetrical cups having a triangular opening, the radius should be about 95% of the diameter of the circle that encompasses the opening of the cup, i.e. touches the three outermost corners, in cups according to FIG. 5 or FIG. 6, good results have been achieved.

The rotary shaft of a cup anemometer usually extends in the anemometer upper part, which in most cases is formed as a neck 4. In the neck the rotary shaft is normally mounted, on the one hand in an upper bearing arranged in the upper part of the neck and, on the other hand, in a lower bearing arranged in the lower part of the neck. In the lower part, the neck changes n a wider housing 5, which in most cases accommodates equipment for recording the speed of rotation of the rotary shaft. Generally seen, the hub 3 and the neck 4 should be long and narrow and of essentially the same diameter, and the housing 5 should be narrow so as not to unnecessarily interfere with the field of current round the anemometer. If the upper part of the hub is terminated abruptly, a lack of equilibrium arises in the field of current and has a detrimental affect on the accuracy. It is therefore convenient to extend the hub 3 upwards so that essentially current symmetry is obtained in the area of the hub 3, the arms 2 and the cups 1. The extension 18 can be farmed as a cylindrical, conical or ellipsoidal extension.

The effect of the asymmetry in the field of current that remains in spite of the extension 18 of hub 3 can be minimised by the symmetry axis of the cups 1 being slightly angled relative to the plane of rotation of the anemometer so that the openings of the cups point slightly upwards to the extension of the hub. In the case of rotationally symmetrical cups, an angle between the symmetry axes of the cups and the plane of rotation of 1–2° is suitable. For the examples in FIG. 5 and FIG. 8 this provides good results.

At very large blowing angles to the plane of rotation from above and from below, it is difficult to retain a flat angular response with cups as described above. A dear improvement is achieved by placing a sheet 17 at the bottom of the cup, said sheet being positioned essentially in the plane of rotation or parallel therewith. The sheet reduces the driving moment for large negative or positive angles of incidence and thus reduces overspeed of the anemometer for these angles.

In a preferred embodiment of the invention with rotationally symmetrical cups, the sheet extends from the point 13 where the symmetry axis of the cup hits the bottom of the cup, along the symmetry axis to about 50% of the distance to the plane 9 which has the symmetry axis as normal and which just touches the corner remotest from the point just mentioned.

A further advantage of a sheet 17 as described above is that it serves as a stiffening in the radial direction. As a result, the shape of the cup, which owing to the centrifugal force tends to be deformed, can be better retained.

The angular response of a cup anemometer according to FIG. 6 with a sheet according to FIG. 4 is shown in FIG. 7 and is here compared with the corresponding angular response of a prior art cup anemometer of the type shown in FIG. 1. The improvement is noticeable.

What is claimed is:

1. A cup anemometer with at least two cups (1) each attached to an arm (2) of a hub (3) on a rotary shaft, cup relating to a generally seen cup-shaped body having a concave inner surface (6) and a convex outer surface (7) which meet at the opening of the cup, the opening of the cups being directed essentially along the tangent to the rotational path of the cups, characterised in that the cups are truncated at their opening by means of three cuts (14, 15, 16) which are essentially located in three planes that are parallel with the tangent of the rotational path of the cups at the opening and that, projected on a fourth plane (9) having the tangent as normal, essentially form a triangle, and that each cup is attached to its arm (2) at one of the three corners (10).

2. A cup anemometer as claimed in claim 1, characterised in that the three corners (10, 11, 12) of the cups (1) are cut-off or rounded.

3. A cup anemometer as claimed in claim 1, characterised in that the rotary shaft extends in a narrow neck (4) which supports the hub (3) with arms (2) and cups (1), and that the hub has an extension (18) on its side facing away from the neck, and that the hub, as well as the extension in an area adjacent to the hub, has a cross-section which essentially conforms with the cross-section of the neck in an area adjacent to the hub, so that substantially current symmetry is obtained in the area of hub, arms and cups.

4. A cup anemometer as claimed in claim 1, characterised in that the cups (1), before being truncated, are rotationally symmetrical.

5. A cup anemometer as claimed in claim 4, characterised in that the highest point (8) of the arcuate recess in the cup wall, measured perpendicular from the plane (9) that touches the three corners of the cup, is essentially ⅓ of the maximum distance from said plane to the highest point (13) of the cup.

6. A cup anemometer as claimed in claim 4, characterised in that the cups (1), before being truncated, are cones.

7. A cup anemometer as claimed in claim 6, characterised in that the cones have an apex angle to their symmetry axis that is essentially 45°.

8. A cup anemometer as claimed in claim 1, characterised in that the triangle seen in said fourth plane (9) is essentially equilateral.

9. A cup anemometer as claimed in claim 7, characterised in that the circumferential surface of the cones is formed by seven curves A–G being allowed to define a plane surface, of which a sector S is excluded and the remaining surface is rolled into a cone, the curves being described in local coordinate systems (x,y) with the origin on the radius R and the angle φ plotted from the positive X-axis in a global coordinate system (X,Y), and the local coordinate systems having the y-axis directed, radially outwards and the x-axis directed in the negative φ direction and, in the local coordinate system, the curves for the corners having the formula $$\frac{y}{R} = a * \left( \sqrt{1 - b*\left(\frac{x}{R}\right)^2} - 1 \right)$$

and the curves for the sides having the formula $$\frac{y}{R} = a * \left(\frac{x}{R}\right)^{1.57} + b$$

and the constants a and b for each curve appearing from the

TABLE

| Curve | Angle φ° | a | b |
|---|---|---|---|
| A | −37.3 | 0.2581 | 19.0 |
| B | 5.1 | 0.3583 | −0.3226 |
| C | 47.6 | 0.2581 | 19.0 |
| D | 90.0 | 0.3583 | −0.3226 |
| E | 132.4 | 0.2581 | 19.0 |
| F | 174.9 | 0.3583 | −0.3226 |
| G | −142.7 | 0.2581 | 19.0 | and the location of the curves in the global coordinate system (X,Y) being obtained by the coordinate transformation $$X = R * \cos \phi + x * \sin \phi + y * \cos \phi$$

$$Y = R * \sin \phi + y * \sin \phi - x * \cos \phi$$

and the sector S being calculated as the difference between angle φ of curve A and angle φ of curve G, i.e. $S = \phi_A - \phi_G = -37.3 - (-142.7) = 105.4°$.

10. A cup anemometer as claimed in claim 7, characterised in that the circumferential surface of the cones is formed by seven curves A–G being allowed to define a plane surface, of which a sector S is excluded and the remaining surface is rolled into a cone, the curves being described in local coordinate systems (x,y) with the origin on the radius R and the angle φ plotted from the positive X-axis in a global coordinate system (X,Y), and the local coordinate systems having the y-xis directed radially outwards and the x-axis directed in the negative φ direction and, in the local coordinate systems, the curves for the corners having the formula $$\frac{y}{R} = a * \left( \sqrt{1 - b * \left(\frac{x}{R}\right)^2} - 1 \right)$$

and the curves for the sides having the formula $$\frac{y}{R} = a * \left(\frac{x}{R}\right)^{1.57} + b$$

and the constants a and b for each curve appearing from the

TABLE

| Curve | Angle φ | a | b |
|---|---|---|---|
| A | −37.3 | 0.2581 | 19.0 |
| B | 5.1 | 0.3583 | −0.3226 |
| C | 47.6 | 0.2581 | 19.0 |
| D' | 90.0 | 0.1928 | −0.2731 |

TABLE-continued

| Curve | Angle φ | a | b |
|---|---|---|---|
| E | 132.4 | 0.2581 | 19.0 |
| F' | 174.9 | 0.1735 | −0.2667 |
| G | −142.7 | 0.2581 | 19.0 | and the location of the curves in the global coordinate system (X,Y) being obtained by the coordinate transformation $$X = R * \cos \phi + x * \sin \phi + y * \cos \phi$$

$$Y = R * \sin \phi + y * \sin \phi - x * \cos \phi$$

and the sector S being calculated as the difference between angle φ of curve A and angle φ of curve G, i.e. $S = \phi_A - \phi_G = 37.3 - (-142.7) = 105.4°$.

11. A cup anemometer as claimed in claim 8, characterised in that the radius, defined as the shortest distance between the rotary shaft and the symmetry axis of the cups (1), is about 95% of the diameter of the circle that encompasses the opening of the cup, ie touches the three outermost corners (10, 11, 12).

12. A cup anemometer as claimed in claim 4, characterised in that the openings of the cups point slightly upwards to the extension (18) of the hub, the symmetry axes of the cups forming an angle of 1–2° to the plane of rotation of the anemometer.

13. A cup anemometer as claimed in claim 1, characterised in that a sheet (17) is placed in the concave interior of each cup and is positioned essentially in the plane of rotation or is parallel therewith.

14. A cup anemometer as claimed in claim 13, characterised in that the cups (1), before being truncated, are rotationally symmetrical and the sheet extends from the point (13) where the symmetry axis hits the bottom of a cup (1), along the symmetry axis to about 50% of the distance to the plane (9) that has the symmetry axis as normal and that just touches the corner (10, 11, 12) remotest from the point just mentioned.

* * * * *